United States Patent
Cho et al.

(10) Patent No.: US 10,503,017 B2
(45) Date of Patent: Dec. 10, 2019

(54) LIQUID CRYSTAL DISPLAY AND MANUFACTURING METHOD THEREOF

(71) Applicant: Samsung Display Co., Ltd., Yongin-si, Gyeonggi-do (KR)

(72) Inventors: Jae Bum Cho, Seoul (KR); Hyeok Jin Lee, Seongnam-si (KR); Oh Jeong Kwon, Hwaseong-si (KR); Ka Eun Kim, Yongin-si (KR); Su Jin Kim, Seoul (KR)

(73) Assignee: SAMSUNG DISPLAY CO., LTD., Gyeonggi-Do (KR)

(*) Notice: Subject to any disclaimer, the term of this patent is extended or adjusted under 35 U.S.C. 154(b) by 215 days.

(21) Appl. No.: 15/499,091

(22) Filed: Apr. 27, 2017

(65) Prior Publication Data
US 2017/0329184 A1 Nov. 16, 2017

(30) Foreign Application Priority Data
May 10, 2016 (KR) .................. 10-2016-0056874

(51) Int. Cl.
*G02F 1/1337* (2006.01)
*C09K 19/56* (2006.01)
*C09K 19/04* (2006.01)

(52) U.S. Cl.
CPC ........ *G02F 1/133707* (2013.01); *C09K 19/56* (2013.01); *G02F 1/133711* (2013.01);
(Continued)

(58) Field of Classification Search
CPC ......... G02F 1/133707; G02F 1/133711; G02F 1/133788; G02F 2001/133761;
(Continued)

(56) References Cited

U.S. PATENT DOCUMENTS

| | | | | |
|---|---|---|---|---|
| 6,060,581 A | * | 5/2000 | Yu | C08G 73/1067 349/182 |
| 2008/0124493 A1 | * | 5/2008 | Sawatari | C09K 19/0225 428/1.2 |

(Continued)

FOREIGN PATENT DOCUMENTS

| | | | |
|---|---|---|---|
| JP | 2004286984 A | 10/2004 | |
| KR | 1020080095663 A | 10/2008 | |
| KR | 101066784 B1 | 9/2011 | |
| KR | 1020150012093 A | 2/2015 | |
| WO | WO-2013103153 A1 * | 7/2013 | ............ C08F 220/18 |

*Primary Examiner* — Sophie Hon
(74) *Attorney, Agent, or Firm* — Cantor Colburn LLP

(57) ABSTRACT

A liquid crystal display including: a first substrate; a second substrate configured to overlap the first substrate and to be separate from the first substrate; a liquid crystal layer disposed between the first substrate and the second substrate and including a liquid crystal molecule; a first alignment layer disposed between the first substrate and the liquid crystal layer; a second alignment layer disposed between the second substrate and the liquid crystal layer; and a plurality of protrusions disposed between the first alignment layer and the liquid crystal layer, wherein at least one protrusion of the plurality of protrusions includes an orientation polymer including a polymerized reactive mesogen, the first alignment layer includes a photo-reactive group, and the liquid crystal layer includes a photoreaction initiator.

14 Claims, 6 Drawing Sheets

(52) U.S. Cl.
CPC .......... *G02F 1/133788* (2013.01); *C09K 2019/0448* (2013.01); *G02F 2001/133726* (2013.01); *G02F 2201/56* (2013.01); *G02F 2202/022* (2013.01); *G02F 2202/023* (2013.01); *Y10T 428/1005* (2015.01)

(58) Field of Classification Search
CPC ..... G02F 2001/133726; G02F 2201/56; G02F 2202/022; Y10T 428/1005; C09K 19/56; C09K 2019/0448
See application file for complete search history.

(56) References Cited

U.S. PATENT DOCUMENTS

| | | | | |
|---|---|---|---|---|
| 2010/0015363 A1* | 1/2010 | Chiang | ............ | G02F 1/133711 428/1.2 |
| 2011/0255039 A1* | 10/2011 | Enomoto | .......... | G02F 1/133305 349/113 |
| 2012/0288686 A1* | 11/2012 | Xu | ........................ | B82Y 10/00 428/172 |
| 2013/0335687 A1* | 12/2013 | Shen | ................ | G02F 1/133753 349/126 |
| 2014/0071390 A1* | 3/2014 | Nakamura | ........ | G02F 1/133711 349/126 |
| 2015/0015826 A1* | 1/2015 | Mizusaki | ............. | C08F 220/18 349/61 |

* cited by examiner

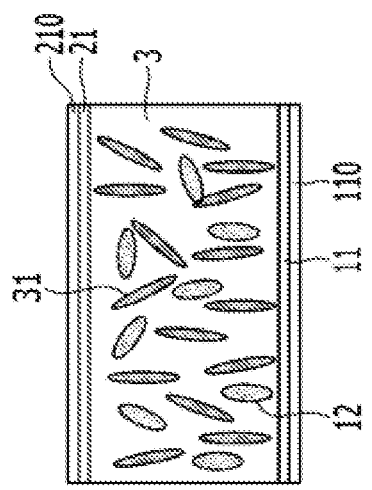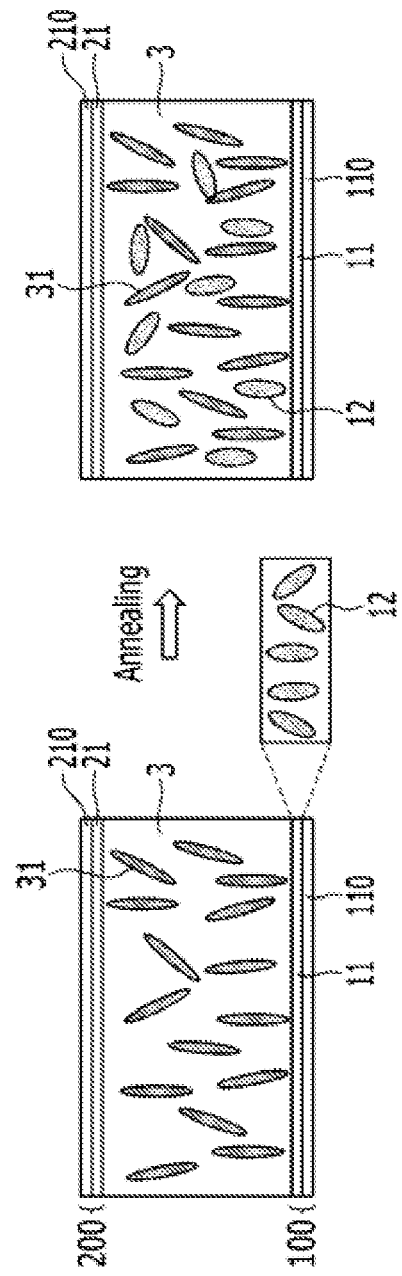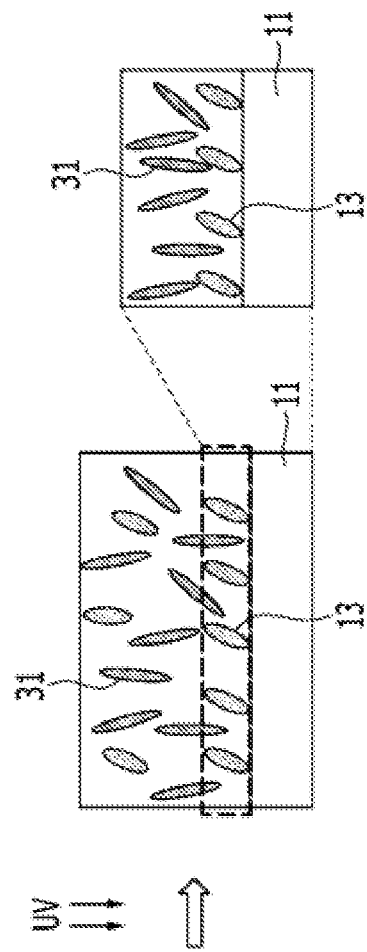
FIG. 3A
FIG. 3B
FIG. 3C

LIQUID CRYSTAL DISPLAY AND MANUFACTURING METHOD THEREOF

This application claims priority to and the benefit of Korean Patent Application No. 10-2016-0056874 filed in the Korean Intellectual Property Office on May 10, 2016, and all the benefits accruing therefrom under 35 U.S.C. § 119, the content of which in its entirety is herein incorporated by reference.

BACKGROUND

(a) Technical Field

The present disclosure relates to a liquid crystal display and a method of manufacturing the liquid crystal display.

(b) Description of the Related Art

A liquid crystal display includes two display panels with field generating electrodes such as a pixel electrode and a common electrode, and a liquid crystal layer interposed therebetween.

The liquid crystal display generates an electric field in the liquid crystal layer by applying a voltage to the field generating electrodes. The orientation of liquid crystal molecules in the liquid crystal layer is determined by the generated electric field, and controls the polarization of incident light so as to display an image.

A curved liquid crystal display device may be used to increase the immersion of a viewer in a large liquid crystal display device.

SUMMARY

Exemplary embodiments provide a liquid crystal display having advantages which include preventing transmissivity reduction due to misalignment of an upper display panel and a lower display panel, controlling display panel stain and texture generation, and promoting protrusion formation at a lower panel and generation of pretilt of liquid crystal molecules.

An exemplary embodiment of the present invention provides a liquid crystal display including: a first substrate; a second substrate configured to overlap the first substrate and to be separate from the first substrate; a liquid crystal layer disposed between the first substrate and the second substrate and including a liquid crystal molecule; a first alignment layer disposed between the first substrate and the liquid crystal layer; a second alignment layer disposed between the second substrate and the liquid crystal layer; and a plurality of protrusions disposed between the first alignment layer and the liquid crystal layer, wherein at least one protrusion of the plurality of protrusions includes an orientation polymer including a polymerized reactive mesogen, the first alignment layer includes a photo-reactive group, and the liquid crystal layer includes a photoreaction initiator.

A liquid crystal molecule adjacent to the first alignment layer has a pretilt angle which may be greater than that of a liquid crystal molecule adjacent to the second alignment layer.

The liquid crystal display may be a curved liquid crystal display.

A protrusion may not be present between the second alignment layer and the liquid crystal layer.

The liquid crystal display may further include a plurality of protrusions disposed between the second alignment layer and the liquid crystal layer, wherein a number of the plurality of protrusions disposed between the second alignment layer and the liquid crystal layer may be about 5% or less of a number of the plurality of protrusions disposed between the first alignment layer and the liquid crystal layer.

The first alignment layer may include a polymer, and the photo-reactive group may be connected to a main chain of the polymer.

The photo-reactive group may include at least one compound represented by the following Chemical Formulas 3 to 15.

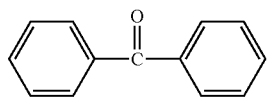

[Chemical Formula 3]

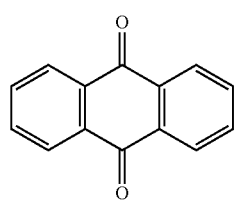

[Chemical Formula 4]

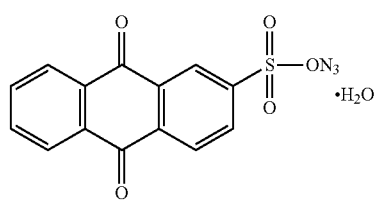

[Chemical Formula 5]

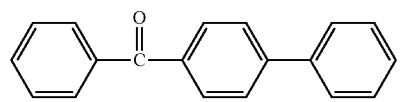

[Chemical Formula 6]

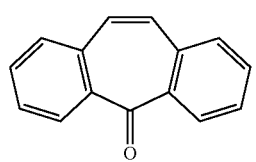

[Chemical Formula 7]

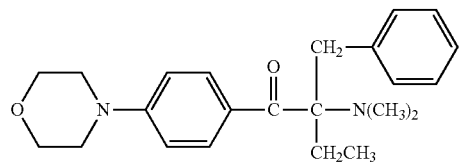

[Chemical Formula 8]

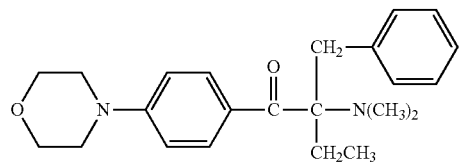

[Chemical Formula 9]

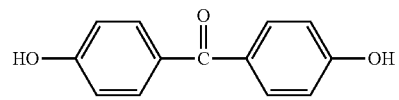

[Chemical Formula 10]

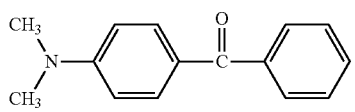

[Chemical Formula 11]
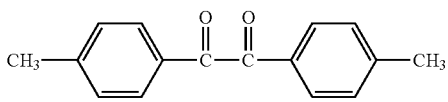

[Chemical Formula 12]
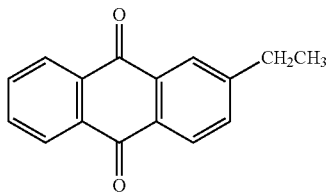

[Chemical Formula 13]
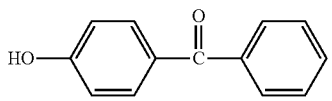

[Chemical Formula 14]
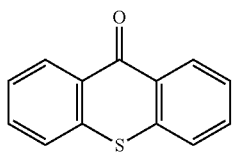

[Chemical Formula 15]
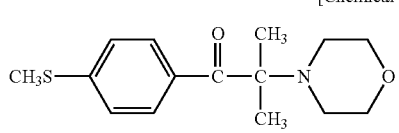

The photoreaction initiator of the liquid crystal display may include at least one compound of the following Chemical Formulas 3 to 15.

[Chemical Formula 3]
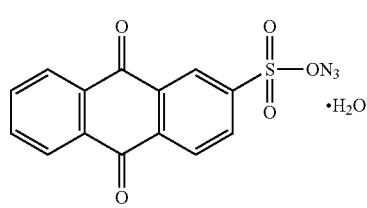

[Chemical Formula 4]
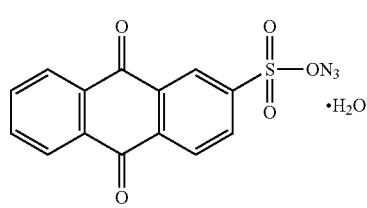

[Chemical Formula 5]
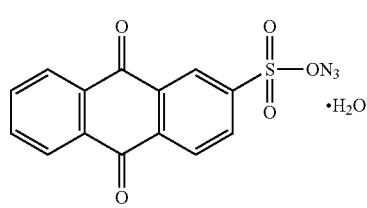

[Chemical Formula 6]
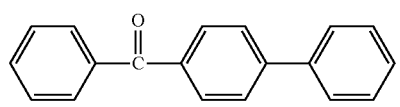

[Chemical Formula 7]
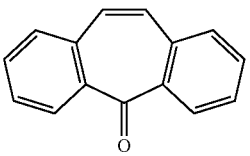

[Chemical Formula 8]
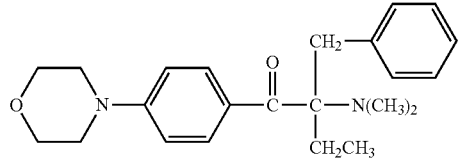

[Chemical Formula 9]
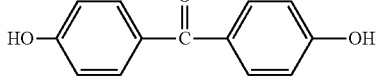

[Chemical Formula 10]
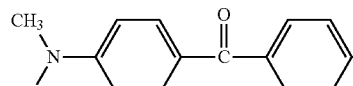

[Chemical Formula 11]
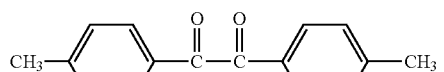

[Chemical Formula 12]
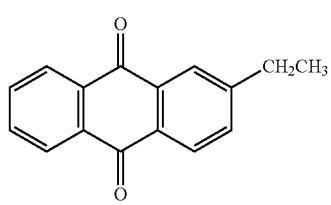

[Chemical Formula 13]
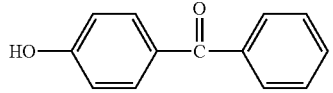

[Chemical Formula 14]
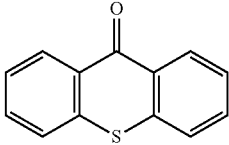

[Chemical Formula 15]
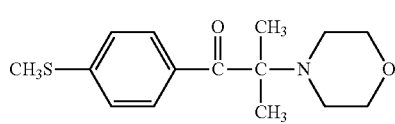

The amount of the photoreaction initiator in the liquid crystal layer may be about 1 weight percent (wt %) or less with respect to a total weight of the liquid crystal layer.

The second alignment layer may not include a photoreactive group.

The reactive mesogen may be a compound having three or more ring structures.

The reactive mesogen may include an acrylate group or methacrylate group at an end thereof.

The reactive mesogen may include a compound represented by the following Chemical Formula 1 or Chemical Formula 2.

[Chemical Formula 1]

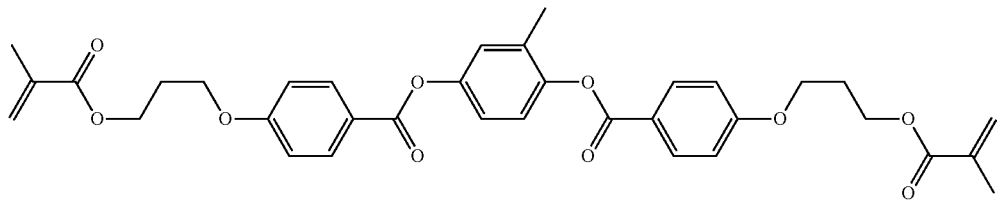

[Chemical Formula 2]

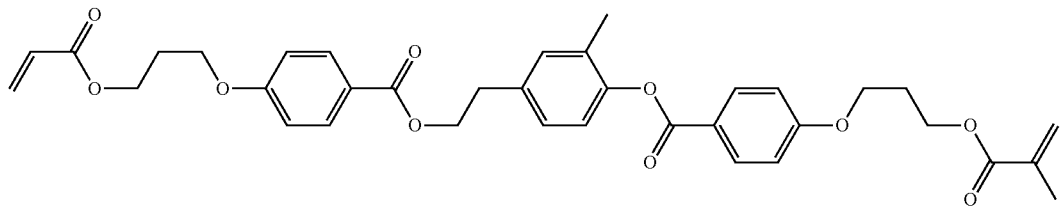

An exemplary embodiment of the present invention provides a method of manufacturing a liquid crystal display including: providing a first display panel including a first alignment layer including a photo-reactive group and a reactive mesogen; providing a second display panel including a second alignment layer; forming a liquid crystal layer including a liquid crystal molecule and a photoreaction initiator between the first display panel and the second display panel; eluting the reactive mesogen included from the first alignment layer into the liquid crystal layer by applying heat; and irradiating ultraviolet (UV) light onto the first display panel, the second display panel, and the liquid crystal layer, wherein a plurality of protrusions are formed between the first alignment layer and the liquid crystal layer in the irradiating of the UV light.

The reactive mesogen may be in the first alignment layer in the form of a mixture.

The first alignment layer may include a polymer, and the photo-reactive group may be connected to a main chain of the polymer.

In the method of manufacturing the liquid crystal display, a liquid crystal molecule adjacent to the first alignment layer has a pretilt angle greater than a pretilt angle of a liquid crystal molecule adjacent to the second alignment layer.

The reactive mesogen may be a compound having three or more ring structures.

The reactive mesogen may include a compound represented by the following Chemical Formula 1 or Chemical Formula 2.

A plurality of protrusions may be formed between the second alignment layer and the liquid crystal layer in the illustrating of the UV light, and a number of the plurality of protrusions disposed between the second alignment layer and the liquid crystal layer may be about 5% or less of a number of the plurality of protrusions disposed between the first alignment layer and the liquid crystal layer.

According to the exemplary embodiments, when a misalignment of the upper display panel and the lower display panel occurs, it is possible to prevent reduction in transmittance and generation of a panel stain or texture, and it is also possible to promote protrusion formation on the lower panel and generation of a pretilt in the liquid crystal molecules.

BRIEF DESCRIPTION OF THE DRAWINGS

The above and other aspects, advantages and features of this disclosure will become more apparent by describing in further detail exemplary embodiments thereof with reference to the accompanying drawings, in which:

FIGS. 3A to 3C illustrate a process of forming protrusions in a liquid crystal display, according to an exemplary embodiment;

[Chemical Formula 1]

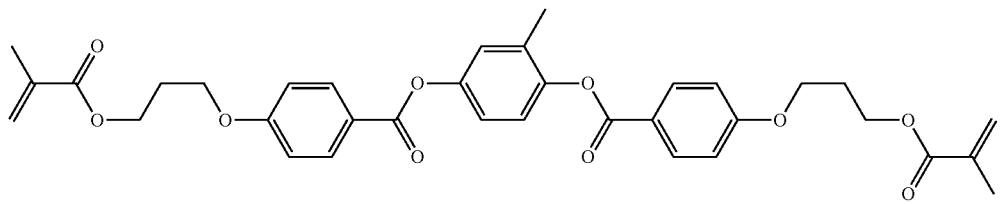

[Chemical Formula 2]

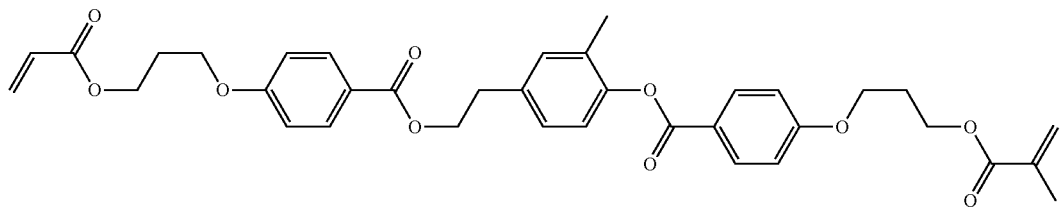

Figure 5:
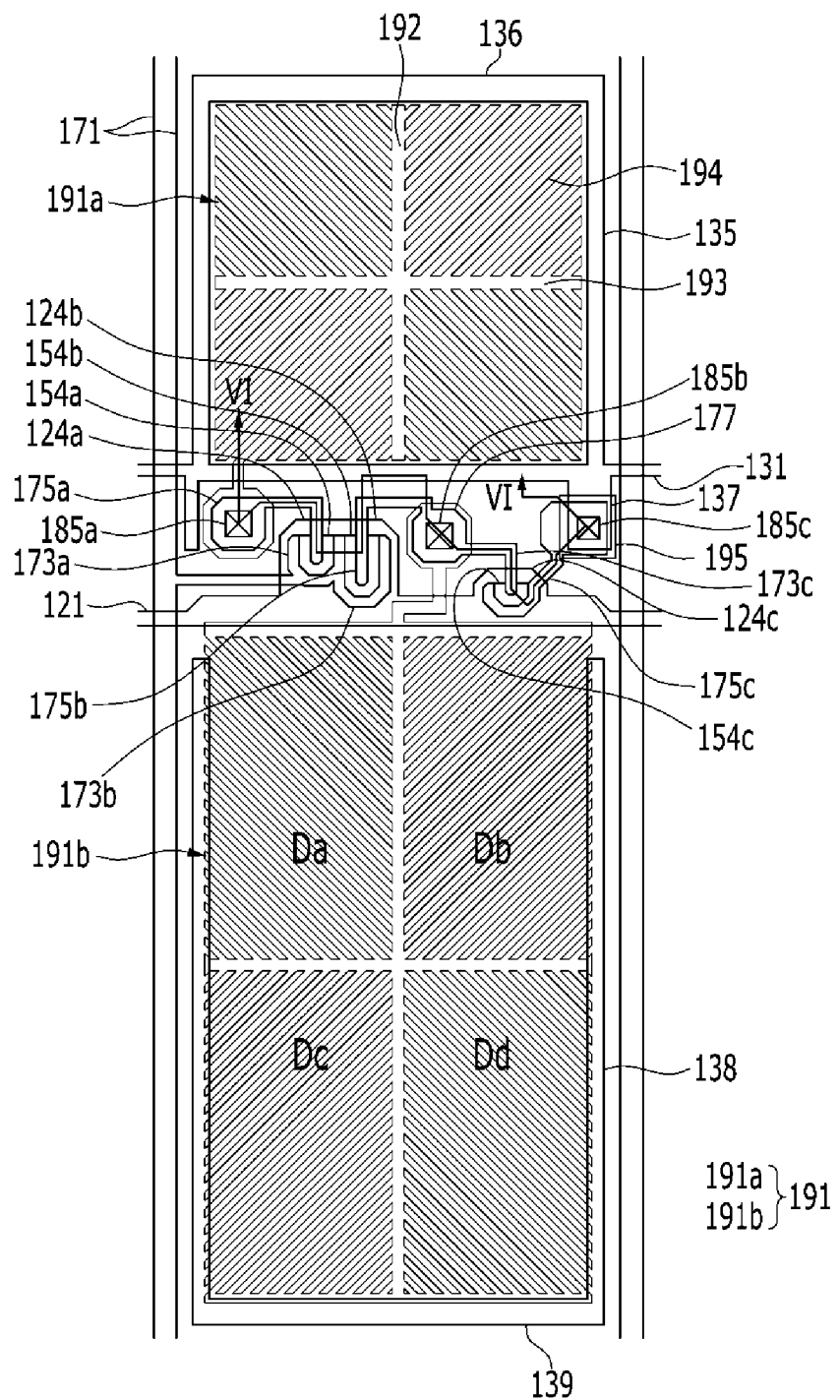
Figure 6:
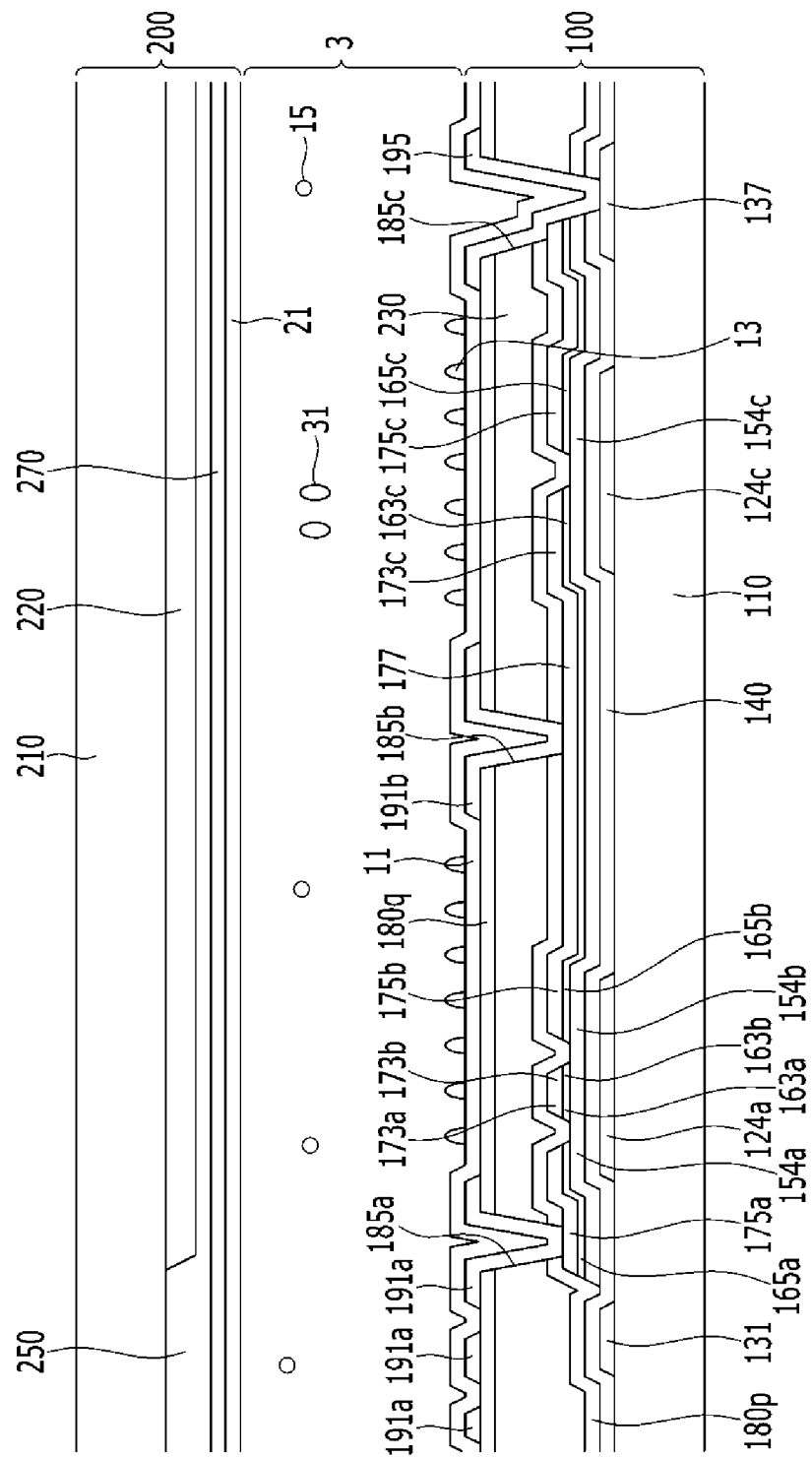

FIGS. 4A to 4D are detailed views illustrating a process of forming a protrusion using a photoreaction initiator and a photo-reactive group included in a first alignment layer of a liquid crystal display, according to an exemplary embodiment;

FIG. 5 is a plan view illustrating one pixel of a liquid crystal display according to an exemplary embodiment; and FIG. 6 is a cross-sectional view taken along line VI-VI of FIG. 5.

DETAILED DESCRIPTION

The present invention will be described more fully hereinafter with reference to the accompanying drawings, in which various embodiments of the invention are shown. As those skilled in the art would realize, the described embodiments may be modified in various different ways, all without departing from the spirit or scope of the present invention. Rather, these embodiments are provided so that this disclosure will be thorough and complete, and will fully convey the scope of the invention to those skilled in the art. Like reference numerals refer to like elements throughout.

To clearly describe the present invention, parts that are irrelevant to the description are omitted, and like numerals refer to like or similar constituent elements throughout the specification.

Further, since sizes and thicknesses of constituent members shown in the accompanying drawings are arbitrarily given for better understanding and ease of description, the present invention is not limited to the illustrated sizes and thicknesses. In the drawings, the thickness of layers, films, panels, regions, etc., are exaggerated for clarity. In the drawings, for better understanding and ease of description, the thicknesses of some layers and areas are exaggerated.

It will be understood that when an element such as a layer, film, region, or substrate is referred to as being "on" another element, it can be directly on the other element or intervening elements may also be present. In contrast, when an element is referred to as being "directly on" another element, there are no intervening elements present. Further, in the specification, the word "on" means positioning on or below the object portion, but does not essentially mean positioning on the upper side of the object portion based on a gravity direction.

It will be understood that, although the terms "first," "second," "third," etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items.

In addition, unless explicitly described to the contrary, the word "comprise" and variations such as "comprises" or "comprising" will be understood to imply the inclusion of stated elements but not the exclusion of any other elements.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Further, in the specification, the phrase "in a plan view" means when an object portion is viewed from above, and the phrase "in a cross-section" means when a cross-section taken by vertically cutting an object portion is viewed from the side.

Figure 1:
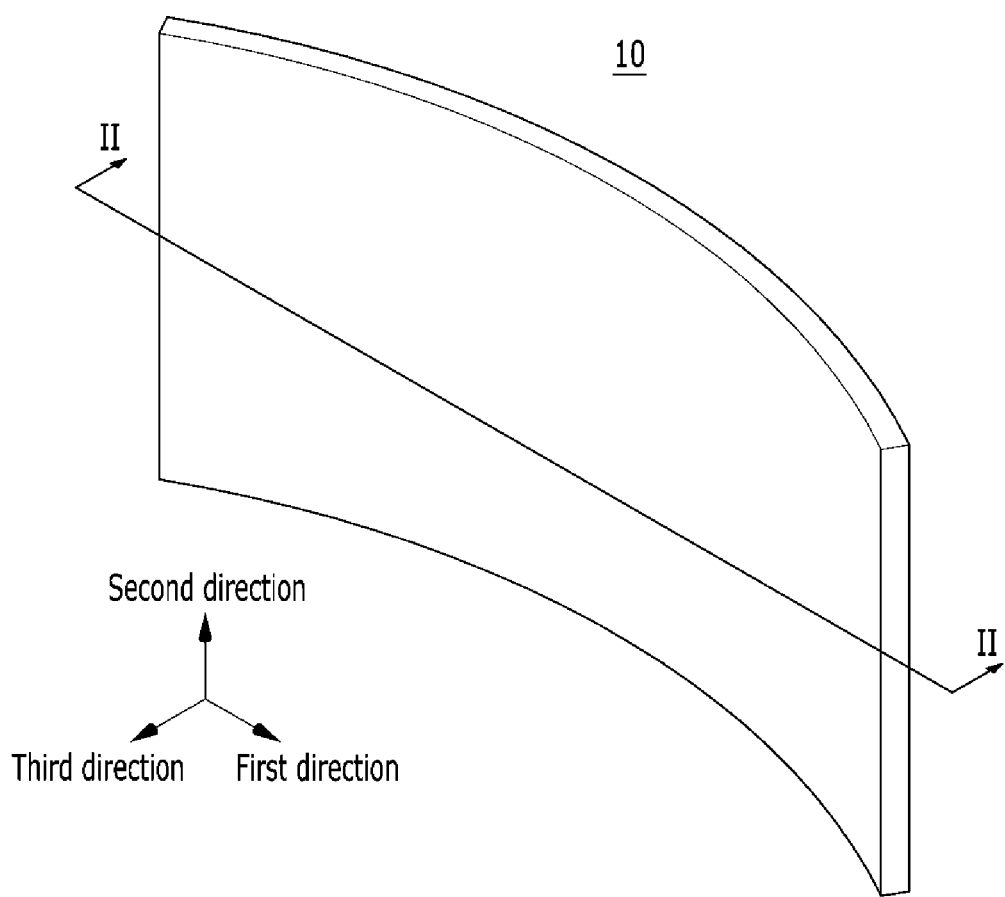
FIG. 1 is a schematic perspective view illustrating a curved liquid crystal display, according to an exemplary embodiment.

Hereinafter, a display device according to an exemplary embodiment will be described with reference to FIG. 1 and FIG. 2. FIG. 1 is a schematic perspective view illustrating a curved liquid crystal display according to an exemplary embodiment, and FIG. 2 is a cross-sectional view taken along line II-II of FIG. 1.

Referring to FIG. 1, a liquid crystal display 10 according to an exemplary embodiment may be a curved type liquid crystal display. The liquid crystal display 10 may be curved with respect to an axis parallel to a horizontal direction, which is a first direction, or may be curved with respect to an axis parallel to a vertical direction, which is a second direction. Although the present specification describes a curved liquid crystal display device 10 that is curved with respect to the axis parallel to the second direction, it should be understood that the present invention is not limited thereto, and that the curved liquid crystal display device may also be applied to a liquid crystal display device curved in an axis parallel to the first direction.

Figure 2:
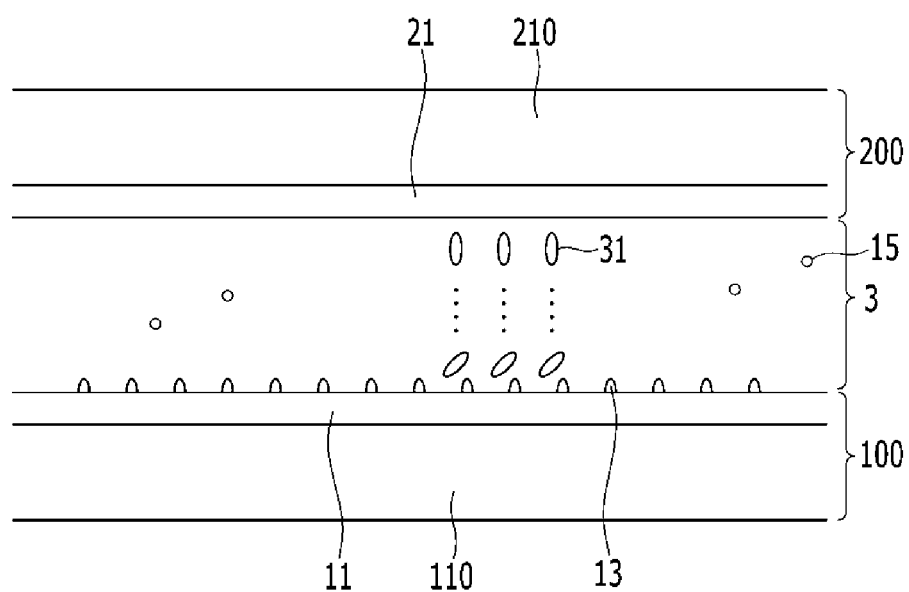
FIG. 2 is a cross-sectional view taken along line II-II of FIG. 1.

Referring to FIG. 1 and FIG. 2, the liquid crystal display 10 includes a first display panel 100, a second display panel 200 overlapped with and separated from the first display panel 100, and a liquid crystal layer 3 disposed between the first display panel 100 and the second display panel 200. The liquid crystal layer 3 includes a liquid crystal molecule 31 and a photoreaction initiator 15.

The first display panel 100 includes a first substrate 110, a first alignment layer 11 disposed between the first substrate 110 and the liquid crystal layer 3, and a plurality of protrusions 13 disposed between the first alignment layer 11 and the liquid crystal layer 3. The protrusions 13 may include an orientation polymer including a polymerized reactive mesogen.

The first alignment layer may include a reactive mesogen. The reactive mesogen may be present in a dispersed form in the first alignment layer 11.

In the present exemplary embodiment, the reactive mesogen may be a compound having three or more ring structures. The reactive mesogen may include at least one of an acrylate group and a methacrylate group at an end of the reactive mesogen or at opposite ends.

In the present exemplary embodiment, the reactive mesogen may include a compound represented by the following Chemical Formula 1 or Chemical Formula 2.

[Chemical Formula 1]

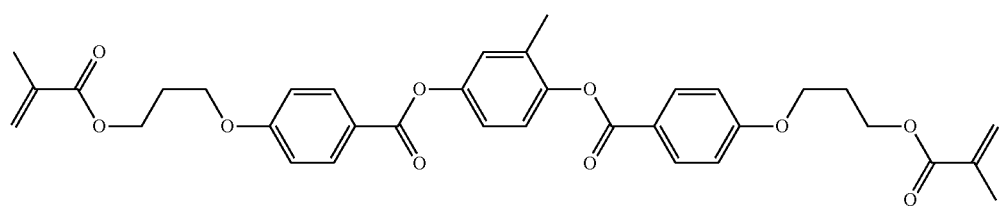

[Chemical Formula 2]

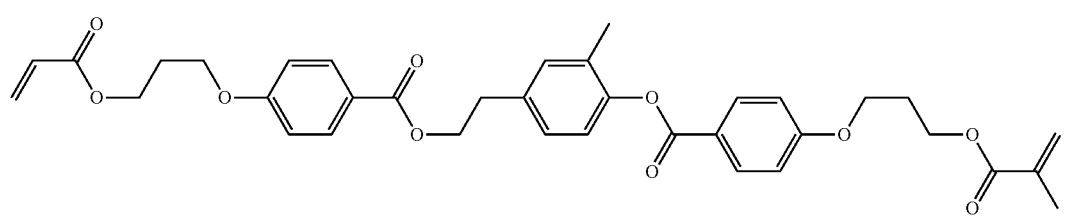

The reactive mesogen contained in the first alignment layer 11 is eluted into the liquid crystal layer 3 in a heating process for forming a pretilt of the liquid crystal display. The reactive mesogen is photopolymerized by irradiation of ultraviolet (UV) light onto the surface of the first alignment layer 11, i.e., between the first alignment layer 11 and the liquid crystal layer 3, to form the protrusion 13.

In the present exemplary embodiment, the first alignment layer 11 may include a polymer, and a photo-reactive group may be connected to a side chain of the polymer. The first alignment layer 11 may include a polymer such as a polyimide. The photo-reactive group may be included in the first alignment layer 11 in the form of a side chain connected to a main chain of the polymer. Alternatively, the reactive mesogen may be present in a mixture with the polymer instead of being present as a side chain of the polymer.

The photo-reactive group included in the first alignment layer may include at least one structure represented by the following Chemical Formulas 3 to 15

[Chemical Formula 3]

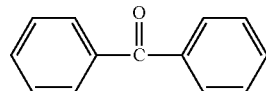

[Chemical Formula 4]

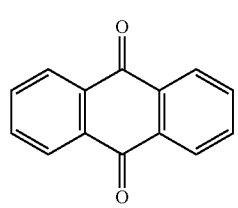

[Chemical Formula 5]

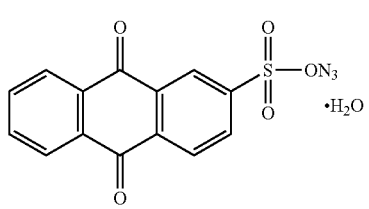

-continued

[Chemical Formula 6]

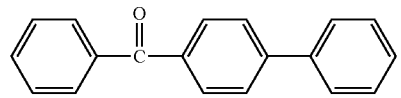

[Chemical Formula 7]

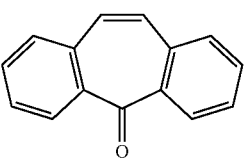

-continued

[Chemical Formula 8]

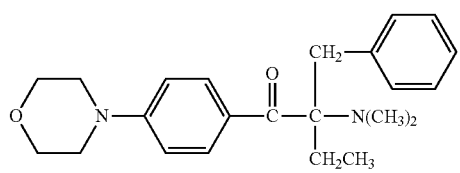

[Chemical Formula 9]

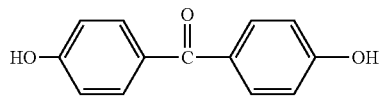

[Chemical Formula 10]

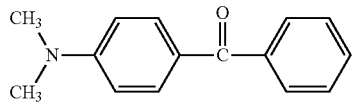

[Chemical Formula 11]

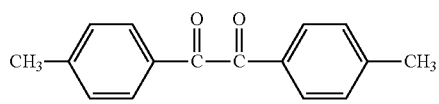

[Chemical Formula 12]

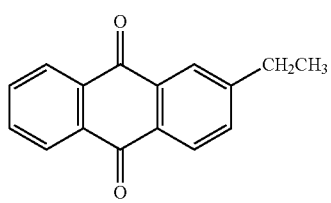

[Chemical Formula 13]

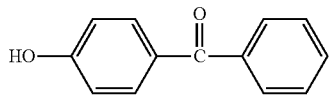

[Chemical Formula 14]

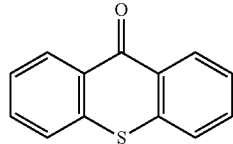

[Chemical Formula 15]

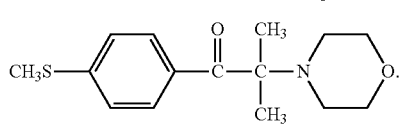

The photo-reactive group included in the first alignment layer promotes photopolymerization of the reactive mesogen.

The second display panel 200 includes a second substrate 210 and a second alignment layer 21 disposed between the second substrate 210 and the liquid crystal layer 3. In the present exemplary embodiment, no protrusion is positioned between the second alignment layer 21 and the liquid crystal layer 3.

The liquid crystal layer 3 includes liquid crystal molecules 31. Liquid crystal molecules 31 which are adjacent to the first alignment layer 11 have a pretilt. As a result, even when no voltage is applied to the liquid crystal layer 3, the liquid crystal molecules 31 adjacent to the first alignment layer 11 can be tilted with respect to a direction perpendicular to the first substrate 110 by the protrusions 13.

The "pretilt" described in this exemplary embodiment indicates that the liquid crystal molecules 31 are tilted with respect to the direction perpendicular to the first substrate 110 or the second substrate 210, and a "pretilt angle" indicates a degree to which the liquid crystal molecules are tilted with respect to the direction perpendicular to the first substrate 110 or the second substrate 210, that is, a tilted angle.

Liquid crystal molecules 31 included in the liquid crystal layer 3 which are adjacent to the second alignment layer 21 may not have a pretilt. That is, in a state where no voltage is applied, the liquid crystal molecules 31 adjacent to the second alignment layer 21 can be oriented substantially perpendicular to the surface of the second alignment layer 21.

The liquid crystal layer 3 has negative dielectric anisotropy, and the liquid crystal layer 3 includes liquid crystal molecules 31 and photoreaction initiators 15. The photoreaction initiator 15 may absorb the energy of light irradiated onto the liquid crystal display and thereby generate radicals that assist in the polymerization of the reactive mesogen, or may react with the reactive mesogen.

That is, the photoreaction initiator 15 promotes formation of the plurality of protrusions 13 positioned between the first alignment layer 11 and the liquid crystal layer 3.

In the present exemplary embodiment, the photoreaction initiator 15 may include one or more of the following Formulas 3 to 15.

[Chemical Formula 3]

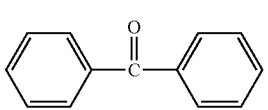

[Chemical Formula 4]

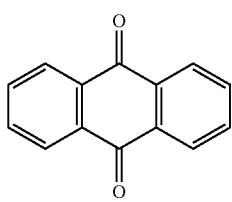

[Chemical Formula 5]

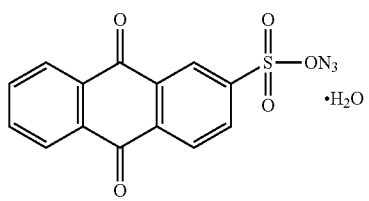

[Chemical Formula 6]

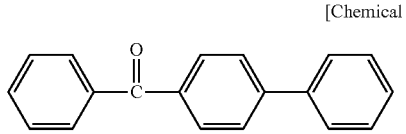

[Chemical Formula 7]

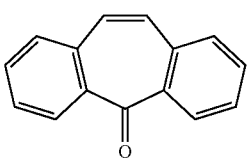

-continued

[Chemical Formula 8]
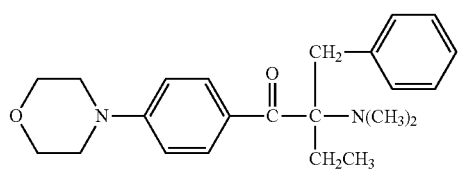

[Chemical Formula 9]
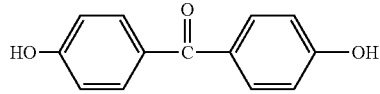

[Chemical Formula 10]
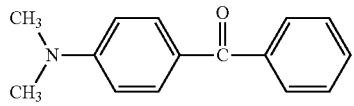

[Chemical Formula 11]
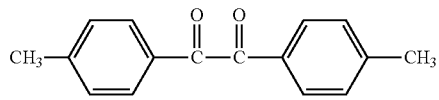

[Chemical Formula 12]
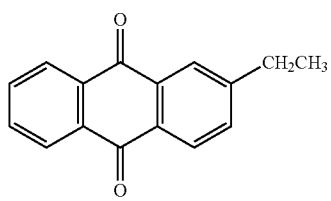

[Chemical Formula 13]
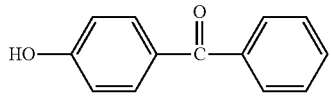

[Chemical Formula 14]
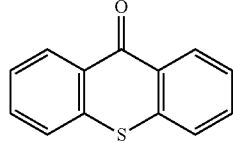

[Chemical Formula 15]
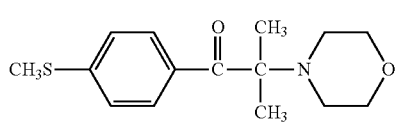

The photoreaction initiator 15 may be present in the form of a mixture in the liquid crystal layer, and the amount of the photoreaction initiator 15 in the liquid crystal layer 3 may be about 1 wt % or less with respect to the total weight of the liquid crystal layer 3.

As such, the liquid crystal display according to the present exemplary embodiment includes a photo-reactive group in the first alignment layer and a photoreaction initiator 15 in the liquid crystal layer 3, to promote formation of the protrusions 13 between the first alignment layer 11 and the liquid crystal layer 3.

FIGS. 3A to 3C illustrates a process of forming a protrusion in a liquid crystal display according to an exemplary embodiment. Referring to FIG. 3A, a liquid crystal display includes the first substrate 110, the first alignment layer 11 disposed on the first substrate 110, the second substrate 210, the second alignment layer 21 disposed on the second substrate 210, and the liquid crystal molecules 31 in the liquid crystal layer 3, which is positioned between the first substrate 110 and the second substrate 210. The first alignment layer 11 may include the reactive mesogen 12. However, the second alignment layer 21 does not include the reactive mesogen.

Next, referring to FIG. 3B, the reactive mesogen 12 in the first alignment layer 11 is eluted into the liquid crystal layer 3 by heating the first alignment layer 11.

Next, referring to FIG. 3C, the reactive mesogen 12 eluted into the liquid crystal layer 3 is photopolymerized by irradiating the surface of the first alignment layer 11 with ultraviolet light to form the protrusions 13. In FIG. 3C, the protrusions 13 may be formed of a polymer including polymerized reactive mesogen 12. Referring to FIG. 3C and its enlarged view, along with the formation of the protrusions 13, a pretilt is formed on the surrounding liquid crystal molecules 31

As a result, even when no voltage is applied to the liquid crystal layer 3, the liquid crystal molecules 31 adjacent to the first alignment layer 11 can be tilted with respect to a direction perpendicular to the first substrate 110 by forming the protrusions 13. However, since the protrusions 13 are not formed in the second alignment layer 21, the liquid crystal molecules 31 adjacent to the second alignment layer 21 do not have a pretilt.

In the case where the pretilt is formed in the liquid crystal molecules 31, the pre-tilted liquid crystal molecules 31 can be rotated rapidly when a voltage is applied thereto, so a response speed thereof is increased.

In the display device according to the present exemplary embodiment, the pretilt is formed only in the liquid crystal molecules 31 adjacent to the first display panel 100 and not in the liquid crystal molecules 31 adjacent to the second display panel 200. In the case of a display device in which the pretilt is formed in both the liquid crystal molecules 31 adjacent to the first display panel 100 and the liquid crystal molecules 31 adjacent to the second display panel 200, and in which the display panels are bent in a curved shape, the direction of the pretilt of the liquid crystal molecules 31 positioned around the first display panel 100 and the direction of the pretilt of the second display panel 200 are changed, which leads to a stain being viewed on the screen.

However, in the display device according to the present exemplary embodiment, since the pretilt is formed only in the liquid crystal molecules 31 adjacent to the first display panel 100, even when the display device is bent, the stain caused by the difference in the pretilt directions is not generated.

In the display device according to the present exemplary embodiment, the first alignment layer 11 includes the photo-reactive group connected to the alignment layer, and the liquid crystal layer 3 includes the photoreaction initiator 15. The photo-reactive group and the photoreaction initiator 15 serve to promote the polymerization reaction of the reactive mesogen 12 eluted from the liquid crystal layer, and therefore the protrusions 13 can be generated better.

In the display device according to the present exemplary embodiment, the reactive mesogen 12 is not included in the liquid crystal layer 3 from the beginning, but rather, is contained in the first alignment layer 11, and is then dissolved into the liquid crystal layer 3 by an elution process which occurs by heating. During the heating process for elution, a portion of the reactive mesogen 12 may be lost due to the high temperature used in the heating process, so that the formation of protrusions is insignificant and the pretilt may not be formed well.

However, in the display device according to the present exemplary embodiment, the reactive mesogen has a structure containing three or more rings. As a result, the reactive mesogen may be a compound represented by the following Chemical Formula 1 or Chemical Formula 2.

[Chemical Formula 1]

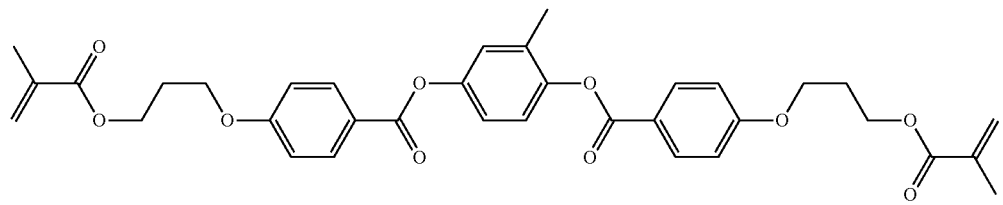

[Chemical Formula 2]

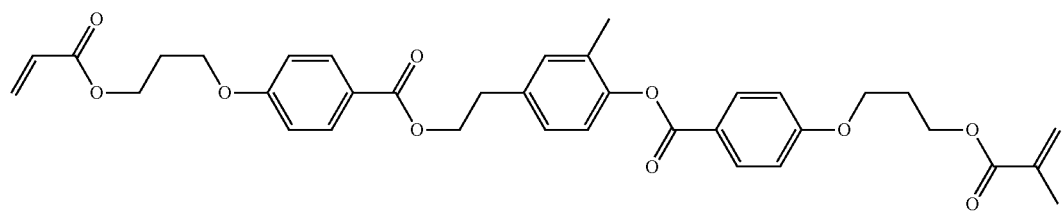

The reactive mesogen having three or more rings is stable against heat and is not damaged when it is eluted from the first alignment layer 11 to the liquid crystal layer 3. However, reactivity of the reactive mesogen to ultraviolet light may be relatively low due to the increased number of rings and the longer length of the molecule. However, in the display device according to the present exemplary embodiment, a photopolymerization of the reactive mesogen is actively performed by the photo-reactive group contained in the first alignment layer and the photoreaction initiator contained in the liquid crystal layer. Thus, the protrusions 13 can be formed at a high density and the liquid crystal molecules 31 can have a pretilt in a region adjacent to the first display panel 100.

Figure 4A:
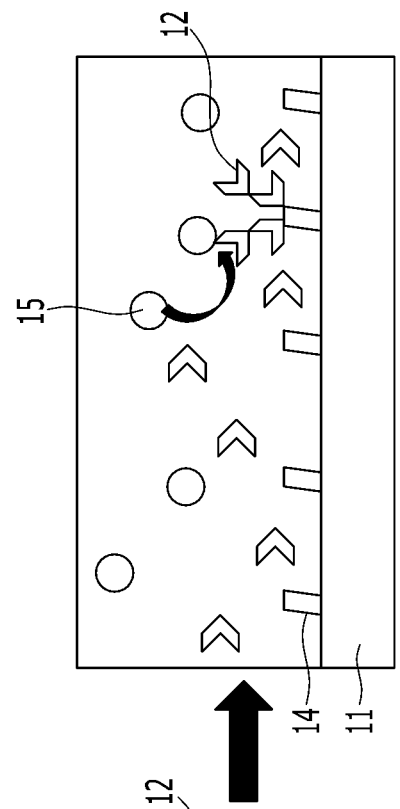

FIGS. 4A to 4D are detailed views illustrating a process of forming a protrusion by a photoreaction initiator 15 and a photo-reactive group included in a first alignment layer in a liquid crystal 3 display, according to an exemplary embodiment. FIG. 4A illustrates the photo-reactive group 14 connected to the first alignment layer 11 as a side chain, the reactive mesogen 12 contained in the first alignment layer and eluted into the liquid crystal layer by heating, and the photoinitiator 15 contained in the liquid crystal layer.

In the vicinity of the photo-reactive group 14, the reactive mesogen 12 is polymerized by a photoreaction. A mass (indicated by a dotted line) formed by the polymerized reactive mesogen 12 becomes a single protrusion 13.

Figure 4B:
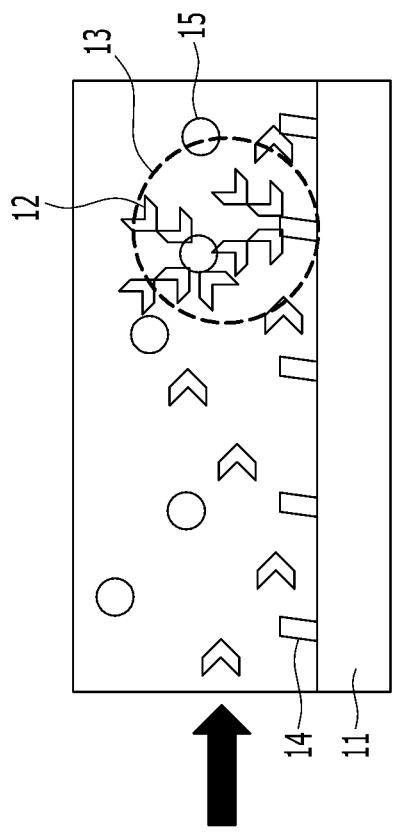
Figure 4C:
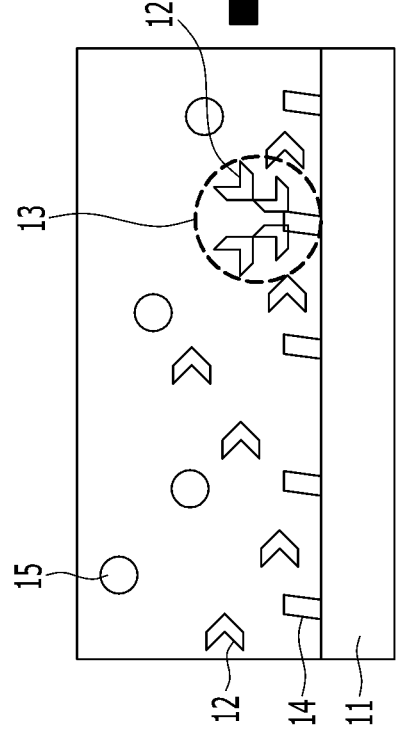
Figure 4D:
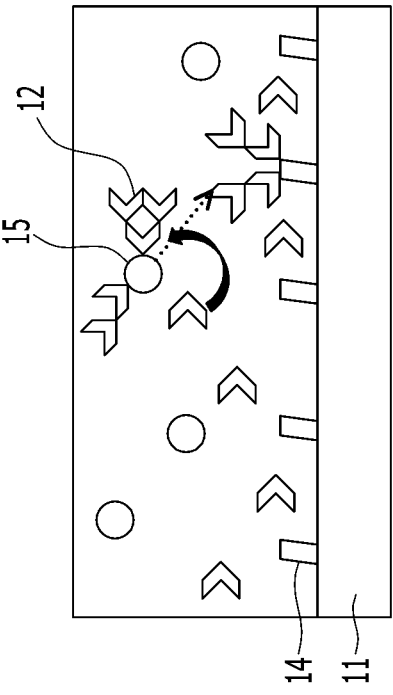

In this polymerization process, the photoreaction initiator 15 included in the liquid crystal layer reacts with the reactive mesogen 12 as shown in FIG. 4B, and the reactive mesogen 12 eluted into the liquid crystal layer are combined with the photoreaction initiator 15 to form larger protrusions 13 as shown in FIG. 4D.

Alternatively, the reactive mesogen 12 reacts with the photoreaction initiator 15 contained in the liquid crystal layer as shown in FIG. 4C, and lumps formed by this reaction may be combined with the photo-reactive group 14 connected to the first alignment layer 11 as a side chain to form the protrusions 13 as shown in FIG. 4D (d).

In other words, when the photo-reactive group 14 is only connected as the side chain to the first alignment layer 11, the polymerization reaction of the reactive mesogen 12 occurs only in the region adjacent to the photo-reactive group 14. However, as shown in the exemplary embodiment of FIGS. 4A to 4D, when the photoreaction initiator 15 is included in the liquid crystal layer, the polymerization reaction of the reactive mesogen occurs not only in the region adjacent to the photoreactor 14, but also in the liquid crystal layer itself, so that the protrusions can be formed more easily.

In the present exemplary embodiment, the first alignment layer 11 includes a photo-reactive group, but the second alignment layer 21 does not include a photo-reactive group. Therefore, the formation of protrusions between the second alignment layer 21 and the liquid crystal layer 3 is minimal. If some protrusions are formed between the second alignment layer 21 and the liquid crystal layer 3 in the process, the number is not more than about 5% of the total number of protrusions located between the first alignment layer 11 and the liquid crystal layer 3.

As a result, the pretilt of the liquid crystal molecules 31 adjacent to the first alignment layer 11 is larger than the pretilt of the liquid crystal molecules 31 adjacent to the second alignment layer 21. This prevents generation of stains in the curved display device as described above.

In the present exemplary embodiment, the first alignment layer 11 may include a polymer, and the photo-reactive group may be connected as a side chain to the main chain of the polymer. The photo-reactive group may be directly connected to the main chain of the polymer of the first alignment layer or may have another connecting group therebetween.

In the present exemplary embodiment, the photo-reactive group may include at least one structure represented by the following Chemical Formulas 3 to 15.

[Chemical Formula 3]

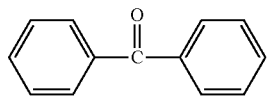

[Chemical Formula 4]

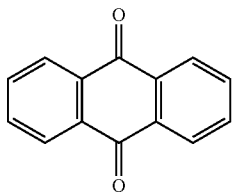

[Chemical Formula 5]

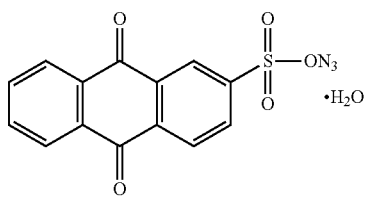

[Chemical Formula 6]

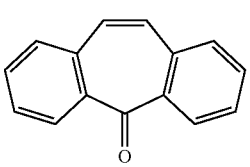

[Chemical Formula 7]

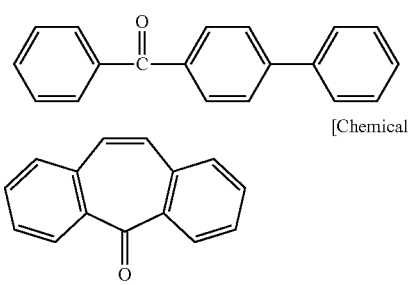

[Chemical Formula 8]

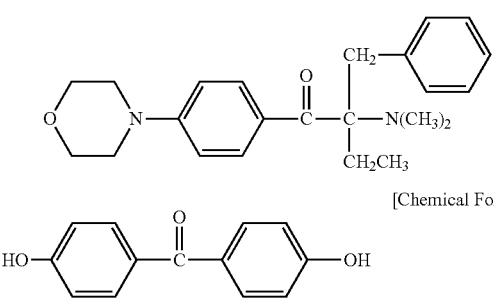

[Chemical Formula 9]

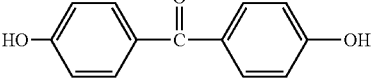

[Chemical Formula 10]

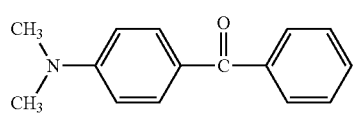

[Chemical Formula 11]

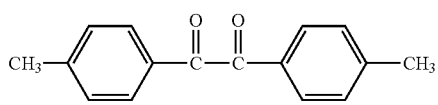

[Chemical Formula 12]

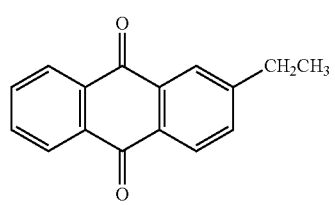

[Chemical Formula 13]

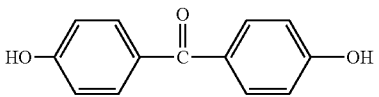

[Chemical Formula 14]

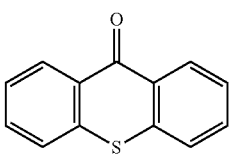

[Chemical Formula 15]

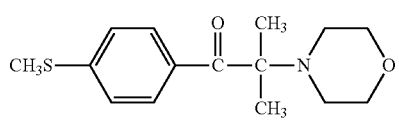

Further, the photoreaction initiator 15 included in the liquid crystal layer 3 may include at least one compound of the following Chemical Formulas 3 to 15.

[Chemical Formula 3]

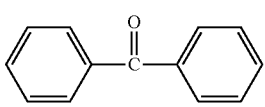

[Chemical Formula 4]

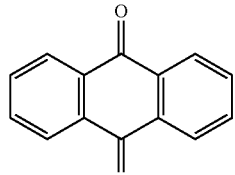

[Chemical Formula 5]

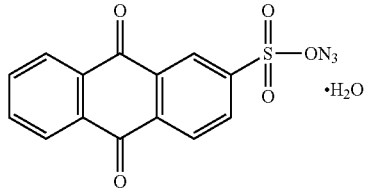

[Chemical Formula 6]

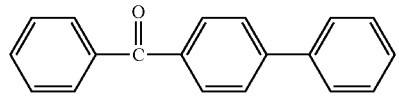

[Chemical Formula 7]

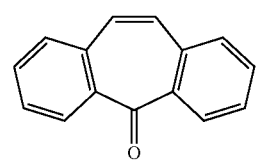

[Chemical Formula 8]

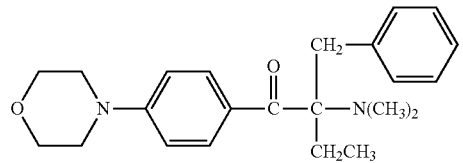

[Chemical Formula 9]

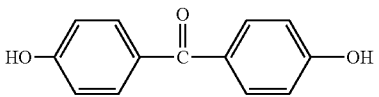

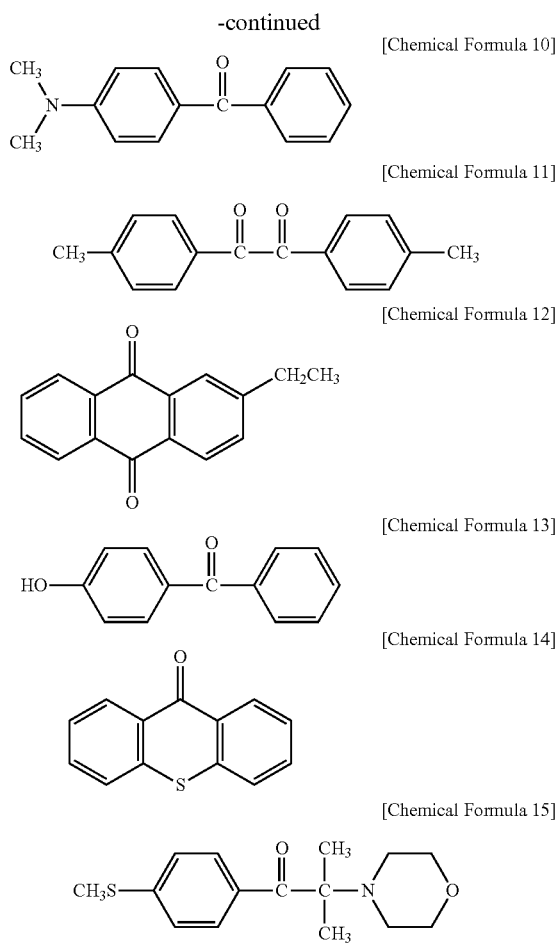

In this case, the amount of the photoreaction initiator included in the liquid crystal layer 3 may be about 1 wt % or less with respect to the total weight of the liquid crystal layer 3.

Hereinafter, a liquid crystal display according to an exemplary embodiment will be described with reference to FIG. 5 and FIG. 6. FIG. 5 is a plan view illustrating a pixel of a liquid crystal display according to an exemplary embodiment, and FIG. 6 is a cross-sectional view taken along line VI-VI of FIG. 5.

First, the first display panel 100 will be described.

A gate conductor including a gate line 121 and a divided reference voltage line 131 is disposed on a first substrate 110 made of transparent glass or plastic.

The gate line 121 includes a first gate electrode 124a, a second gate electrode 124b, and a third gate electrode 124c.

The divided reference voltage line 131 includes first storage electrodes 135 and 136 and a reference electrode 137. Second storage electrodes 138 and 139 may be disposed to overlap a second subpixel electrode 191b although they are not connected to the divided reference voltage line 131.

A gate insulating layer 140 is disposed on the gate line 121 and the divided reference voltage line 131.

A first semiconductor layer 154a, a second semiconductor layer 154b, and a third semiconductor layer 154c are disposed on the gate insulating layer 140. Ohmic contacts 163a, 165a, 163b, 165b, 163c, and 165c are disposed on the semiconductors layer 154a, 154b, and 154c.

A data conductor including a first drain electrode 175a, a second drain electrode 175b, a third source electrode 173c, a third drain electrode 175c, and a data line 171 connected with a first source electrode 173a and a second source electrode 173b, is disposed on the ohmic contacts 163a, 165a, 163b, 165b, 163c, and 165c and the gate insulating layer 140.

The first gate electrode 124a, the first source electrode 173a, and the first drain electrode 175a constitute a first thin film transistor together with the first semiconductor layer 154a; the second gate electrode 124b, the second source electrode 173b, and the second drain electrode 175b constitute a second thin film transistor together with the second semiconductor layer 154b; and the third gate electrode 124c, the third source electrode 173c, and the third drain electrode 175c constitute a third thin film transistor together with the third semiconductor layer 154c.

The second drain electrode 175b is connected to the third source electrode 173c, and includes an extension 177 which is widely extended.

A first passivation layer 180p is disposed on the data conductors 171, 173c, 175a, 175b, and 175c and the semiconductor layers 154a, 154b, and 154c.

A color filter 230 is disposed on the first passivation layer 180p. The color filter 230 is extended in a vertical direction along two data lines 171 adjacent to each other. In the present exemplary embodiment, the color filter 230 has been described and illustrated to be included in the first display panel 100, but the present invention is not limited thereto. The color filter 230 may be included in the second display panel 200.

A second passivation layer 180q is disposed on the color filter 230. The first passivation layer 180p and the second passivation layer 180q may include an inorganic insulating layer that is formed of a silicon nitride or a silicon oxide.

The second passivation layer 180q prevents the color filter 230 from being lifted and suppresses contamination of the liquid crystal layer 3 due to an organic material, such as a solvent, having flowed from the color filter 230, thereby preventing an abnormality such as a residual image which can occur when a screen is operated.

The first passivation layer 180p and the second passivation layer 180q respectively have a first contact hole 185a and a second contact hole 185b defined therein to overlap the first drain electrode 175a and the second drain electrode 175b.

The first passivation layer 180p, the second passivation layer 180q, and the gate insulating layer 140 have a third contact hole 185c defined therein to overlap a portion of the reference electrode 137 and a portion of the third drain electrode 175c, and the third contact hole 185c is covered with a connecting member 195. The connecting member 195 serves to electrically connect the third drain electrode 175c with the reference electrode 137, which is overlapped with the third contact hole 185c.

A pixel electrode 191 is disposed on the second passivation layer 180q. The pixel electrode 191 serves as a field generating electrode. Each pixel electrode 191 includes a first subpixel electrode 191a and a second subpixel electrode 191b, which are separated from each other with the gate line 121 interposed therebetween, and are adjacent in a column direction based on the gate line 121.

The pixel electrode 191 may include a transparent material such as indium tin oxide (ITO) and indium zinc oxide (IZO).

An overall shape of the first sub-pixel electrode 191a and the second sub-pixel electrode 191b is a rectangle, and includes a cross-shaped stem portion including a transverse stem portion 193 and a vertical stem portion 192 orthogonal thereto. In addition, each of the first subpixel electrode 191a and the second subpixel electrode 191b is divided into a first subarea Da, a second subarea Db, a third subarea Dc, and a fourth subarea Dd by the horizontal stem 193 and the vertical stem 192, and includes a plurality of minute branches 194 in each of the subareas Da-Dd.

The first subpixel electrode 191a and the second subpixel electrode 191b are physically and electrically connected to the first drain electrode 175a or the second drain electrode 175b, and receive the data voltage from the first drain electrode 175a and the second drain electrode 175b, respectively. In this case, some of the data voltage applied to the second drain electrode 175b is divided through the third source electrode 173c, so that a size of the voltage applied to the first subpixel electrode 191a may be larger than that of the voltage applied to the second subpixel electrode 192b.

The first subpixel electrode 191a and the second sub-pixel electrode 191b to which the data voltage is applied, generate an electric field together with a common electrode 270 of the second display panel 200 to determine a direction of the liquid crystal molecules 31 of the liquid crystal layer 3 disposed between the two electrodes 191 and 270. The luminance of the light passing through the liquid crystal layer 3 varies depending on the direction of the liquid crystal molecules 31.

The description of the above-described thin film transistor and the pixel electrode 191 is only one example, and the structure of the thin film transistor and the design of the pixel electrode may be changed to improve lateral visibility.

The first alignment layer 11 may be disposed on the pixel electrode 191, and the first alignment layer 11 may be the first alignment layer 11 described with reference to FIG. 1 to FIG. 4. In other words, the first alignment layer may include a photoreactive group linked in the form of a side chain.

The protrusion 13 is disposed on the first alignment layer 11. The protrusion 13 is the same as the protrusion 13 described with reference to FIG. 1 to FIG. 4. In other words, the protrusion 13 is a polymer in which a reactive mesogen is polymerized.

Next, the second display panel 200 will be described.

The second substrate 210 is disposed to overlap the first substrate 110 and to be separate from the first substrate 110. A light blocking member 220 is disposed between the second substrate 210 and the liquid crystal layer 3. The light blocking member 220 is disposed in the second display panel 200 to overlap an area where the data line 171 of the first display panel 100 is disposed and the area where the thin film transistor or the like is disposed. Although the light blocking member 220 has been described and illustrated with respect to the exemplary embodiment in which the light blocking member 220 is included in the second display panel 200, it is not limited thereto. For example, the light blocking member may be included in the first display panel 100.

An overcoat 250 is disposed between the light blocking member 220 and the liquid crystal layer 3. According to another exemplary embodiment, the overcoat 250 may be omitted.

The common electrode 270 serving as a field generating electrode is disposed between the overcoat 250 and the liquid crystal layer 3. The common electrode 270 generates an electric field together with the pixel electrode 191 of the first display panel 100 to determine a direction of the liquid crystal molecules 31 of the liquid crystal layer 3.

The second alignment layer 21 is disposed between the common electrode 270 and the liquid crystal layer 3, and the second alignment layer 21 may be the second alignment layer 21 described with reference to FIG. 1 to FIG. 4. That is, the second alignment layer may not include a photoreactive group.

Protrusions are not disposed between the second alignment layer 21 and the liquid crystal layer 3. The liquid crystal layer 3 including the liquid crystal molecule 31 is disposed between the first alignment layer 11 and the second alignment layer 21, and the liquid crystal layer 3 has negative dielectric anisotropy. The liquid crystal layer 3 includes the photoreaction initiator 15. The content of the photoreaction initiator 15 may be about 1 wt % or less with respect to the entire liquid crystal layer 3. The photoreaction initiators are the same as described above.

Hereinafter, a method of manufacturing a liquid crystal display according to an exemplary embodiment will be described. The method of manufacturing the liquid crystal display according to the present exemplary embodiment includes: preparing a first display panel including a first alignment layer including a photo-reactive group and a reactive mesogen; preparing a second display panel including a second alignment layer; forming a liquid crystal layer including a liquid crystal molecule and a photoreaction initiator between the first display panel and the second display panel; eluting the reactive mesogen from the first alignment layer into the liquid crystal layer by applying heat; and irradiating UV light onto the first display panel, the second display panel, and the liquid crystal layer. In the irradiating of the UV light, a plurality of protrusions are formed between the first alignment layer and the liquid crystal layer.

First, the preparing of the first display panel in which the first alignment layer including the photo-reactive group and the reactive mesogen is formed will be described.

In this case, the first alignment layer includes a polymer, and the photoreactor may be connected as a side chain to the main chain of the polymer. The photo-reactive group may include at least one structure of compounds represented by Chemical Formulas 3 to 15.

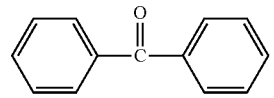

[Chemical Formula 3]

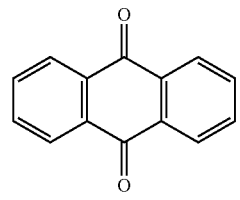

[Chemical Formula 4]

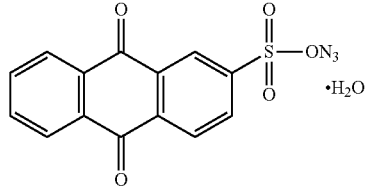

[Chemical Formula 5]

[Chemical Formula 6]
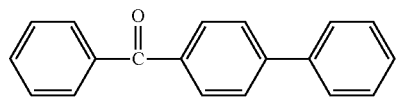

[Chemical Formula 7]
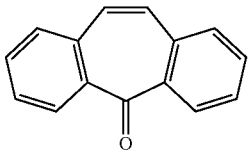

[Chemical Formula 8]
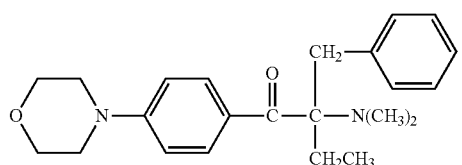

[Chemical Formula 9]
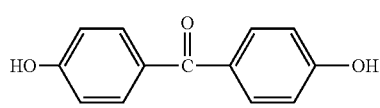

[Chemical Formula 10]
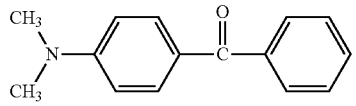

[Chemical Formula 11]
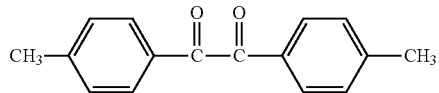

[Chemical Formula 12]
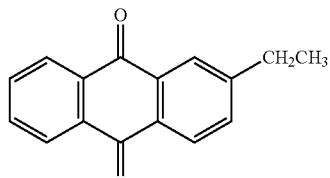

[Chemical Formula 13]
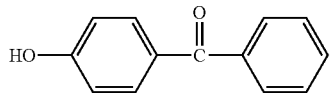

[Chemical Formula 14]
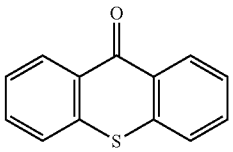

[Chemical Formula 15]
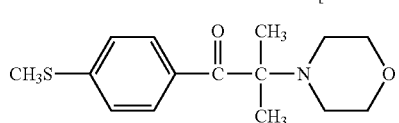

The reactive mesogen may be dispersed in the first alignment layer. In other words, the reactive mesogen may be included in the first alignment layer in the form of a mixture.

In the present exemplary embodiment, the reactive mesogen may be a compound having three or more ring structures. The reactive mesogen may include an acrylate group or a methacrylate group at an end thereof.

The reactive mesogen may include a compound represented by the following Chemical Formula 1 or 2.

[Chemical Formula 1]
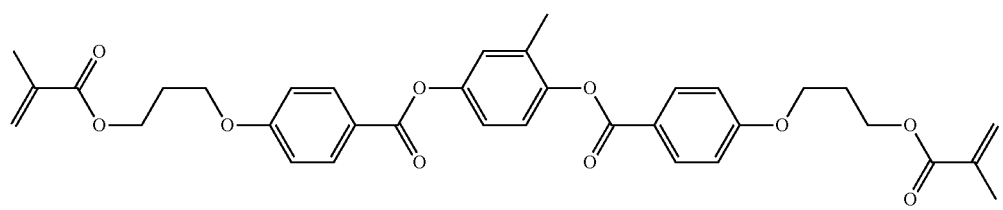

[Chemical Formula 2]
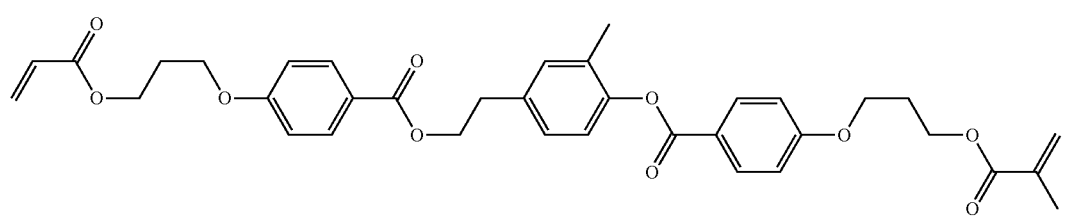

The first display panel prepared in this step may be the first display panel 100 described above with reference to FIG. 5 and FIG. 6.

Next, the preparing of the second display panel in which the second alignment layer is formed will be described. The second alignment layer does not include a photo-reactive group. The second display panel prepared in this step may be the second display panel 200 described with reference to FIG. 5 and FIG. 6.

Next, the forming of the liquid crystal layer including the liquid crystal molecule and the photoreaction initiator between the first display panel and the second display panel will be described. The photoreaction initiator in this step may be one or more compounds represented by the following Formulas 3 to 15. In this case, the content of the photoreaction initiator 15 may be about 1 wt % or less with respect to the total weight of the liquid crystal layer.

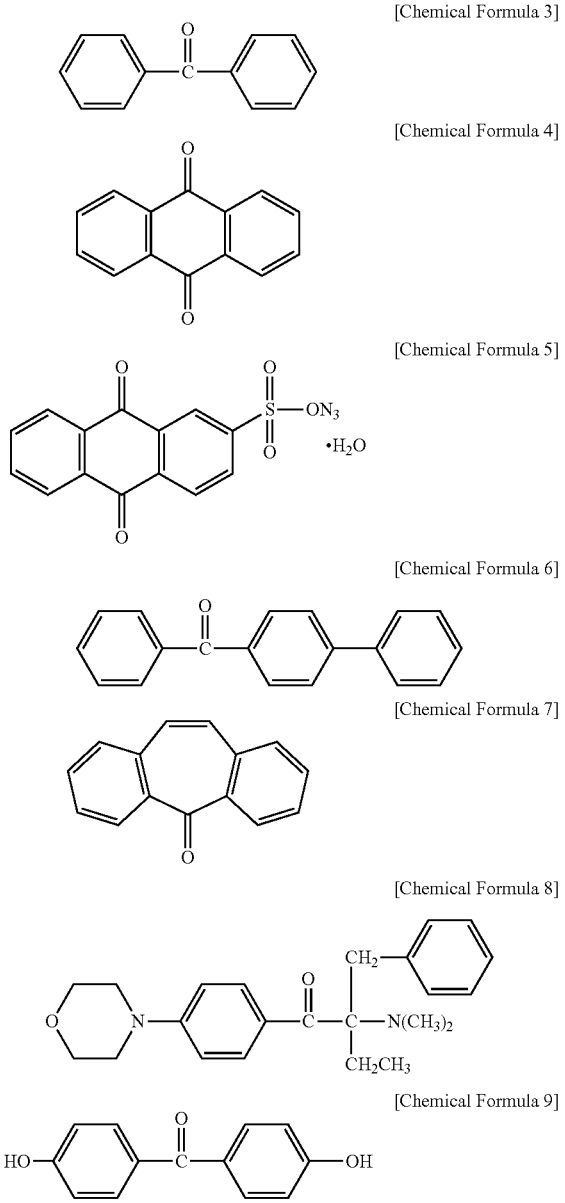

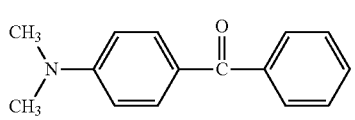

[Chemical Formula 10]

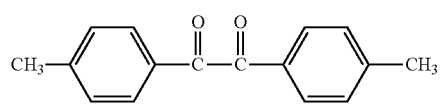

[Chemical Formula 11]

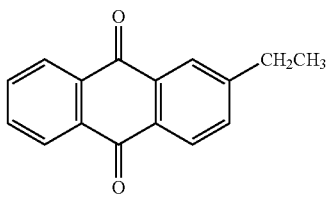

[Chemical Formula 12]

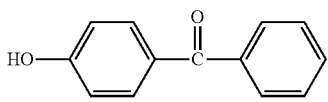

[Chemical Formula 13]

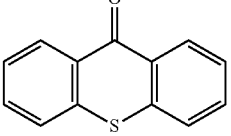

[Chemical Formula 14]

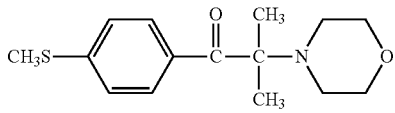

[Chemical Formula 15]

Next, the eluting of the reactive mesogen from the first alignment layer into the liquid crystal layer by applying heat will be described. The reactive mesogen contained in the first alignment film is eluted into the liquid crystal layer by heating. The heating temperature can be about 200° C. or more.

Next, the irradiating of the UV light onto the first display panel, the second display panel, and the liquid crystal layer will be described. In this case, a plurality of protrusions are formed between the first alignment layer and the liquid crystal layer by UV irradiation. This UV irradiation may be performed in a state where a constant voltage is applied to the first display panel and the second display panel.

As described above, the reactive mesogen eluted into the liquid crystal layer reacts with the photo-reactive group of the first alignment layer and the photoreaction initiator of the liquid crystal layer, and the reactive mesogen is polymerized to form a protrusion.

In the irradiating of the UV light, a pretilt angle is formed in the liquid crystal molecules, and liquid crystal molecules adjacent to the first alignment layer have a pretilt angle which is greater than a pretilt angle of liquid crystal molecules adjacent to the second alignment layer.

In the irradiating of the UV light, a small number of protrusions may be formed between the second alignment layer and the liquid crystal layer. In this case, the number of protrusions disposed between the second alignment layer and the liquid crystal layer may be about 5% or less of the number of protrusions disposed between the first alignment layer and the liquid crystal layer.

Therefore, according to the above-described manufacturing method, it is possible to manufacture a display device in which a protrusion and a pretilt are formed only in the first alignment layer, and the problem of stain caused by substrate misalignment when a curved display device is implemented can be solved.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display comprising:
a first substrate;
a second substrate configured to overlap the first substrate and to be separate from the first substrate;
a liquid crystal layer disposed between the first substrate and the second substrate, and comprising a liquid crystal molecule;
a first alignment layer disposed between the first substrate and the liquid crystal layer; a second alignment layer disposed between the second substrate and the liquid crystal layer; and
a plurality of protrusions disposed between the first alignment layer and the liquid crystal layer,
wherein at least one protrusion of the plurality of protrusions comprises an orientation polymer comprising a polymerized reactive mesogen,
wherein the first alignment layer comprises an alignment polymer comprising a main chain, and a photo-reactive group connected as a side chain to the main chain,
wherein the orientation polymer and the alignment polymer are different polymers,
wherein the photo-reactive group comprises a structure of at least one compound represented by the following Chemical Formulas 3 to 15:

[Chemical Formula 3]
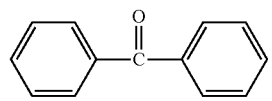

[Chemical Formula 4]
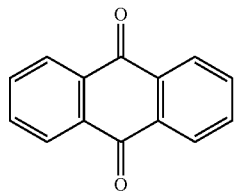

[Chemical Formula 5]
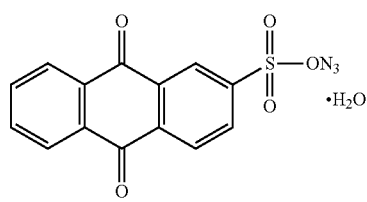

[Chemical Formula 6]
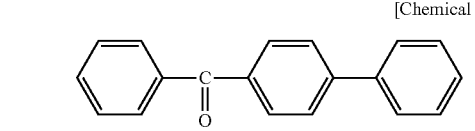

[Chemical Formula 7]
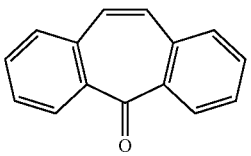

[Chemical Formula 8]
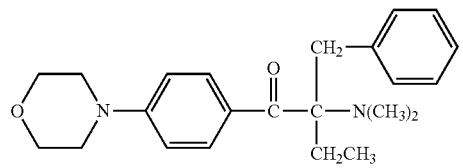

[Chemical Formula 9]
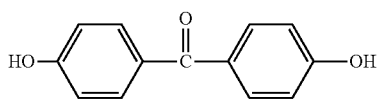

[Chemical Formula 10]
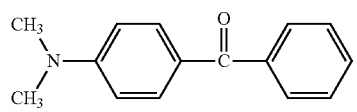

[Chemical Formula 11]
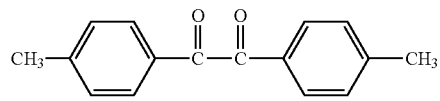

[Chemical Formula 12]
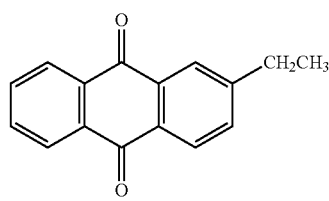

[Chemical Formula 13]
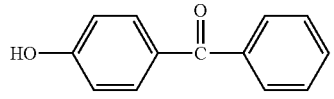

[Chemical Formula 14]
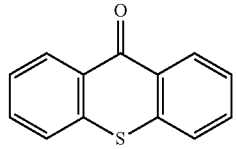

[Chemical Formula 15]
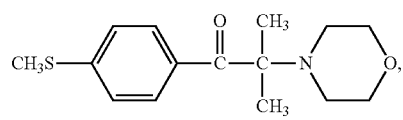

wherein the liquid crystal layer comprises a photoreaction initiator comprising at least one compound represented by the Chemical Formulas 3 to 15, and
wherein a liquid crystal molecule adjacent to the first alignment layer has a pretilt angle greater than a liquid crystal molecule adjacent to the second alignment layer.

2. The liquid crystal display of claim 1, wherein the liquid crystal display is a curved liquid crystal display.

3. The liquid crystal display of claim 1, wherein a protrusion is not present between the second alignment layer and the liquid crystal layer.

4. The liquid crystal display of claim 1, further comprising a plurality of protrusions disposed between the second alignment layer and the liquid crystal layer, wherein a number of the plurality of protrusions disposed between the second alignment layer and the liquid crystal layer is about 5% or less of a number of the plurality of protrusions disposed between the first alignment layer and the liquid crystal layer.

5. The liquid crystal display of claim 1, wherein an amount of the photoreaction initiator in the liquid crystal layer is about 1 weight percent or less with respect to a total weight of the liquid crystal layer.

6. The liquid crystal display of claim 1, wherein the second alignment layer does not comprise a photo-reactive group.

7. The liquid crystal display of claim 1, wherein the reactive mesogen is a compound having three or more ring structures.

8. The liquid crystal display of claim 7, wherein the reactive mesogen comprises an acrylate group or methacrylate group at an end thereof.

9. The liquid crystal display of claim 7, wherein the reactive mesogen comprises a compound represented by the following Chemical Formula 1 or Chemical Formula 2:

[Chemical Formula 1]

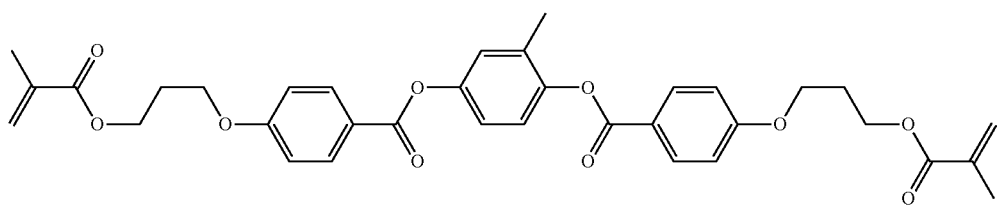

[Chemical Formula 2]

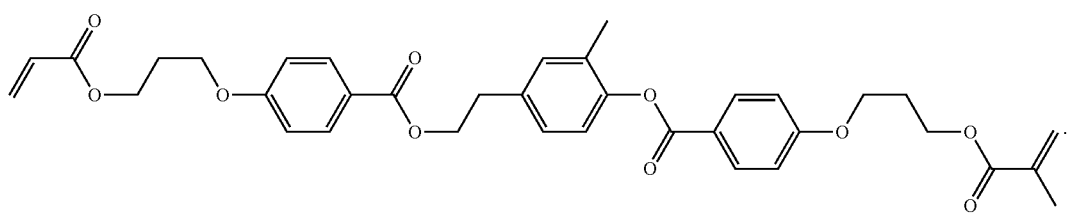

10. A method of manufacturing a liquid crystal display, the method comprising:
providing a first display panel comprising a first alignment layer comprising an alignment polymer and a reactive mesogen, wherein the alignment polymer comprises a main chain and a photo-reactive group connected as a side chain to the main chain;
providing a second display panel comprising a second alignment layer;
forming a liquid crystal layer comprising a liquid crystal molecule and a photoreaction initiator between the first display panel and the second display panel;
eluting the reactive mesogen from the first alignment layer into the liquid crystal layer by applying heat; and
irradiating ultraviolet light onto the first display panel, the second display panel, and the liquid crystal layer,
wherein in the irradiating of the ultraviolet light, a plurality of protrusions comprising an orientation polymer comprising a polymerized reactive mesogen, are formed between the first alignment layer and the liquid crystal layer,
wherein the orientation polymer and the alignment polymer are different polymers,
wherein the photo-reactive group comprises a structure of at least one compound represented by the following Chemical Formulas 3 to 15:

[Chemical Formula 3]

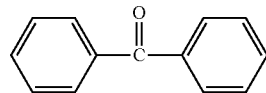

[Chemical Formula 4]

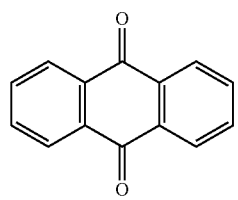

-continued

[Chemical Formula 5]

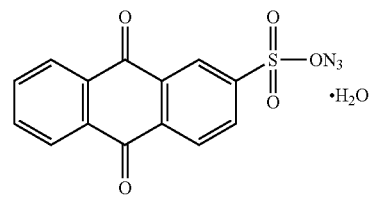

[Chemical Formula 6]

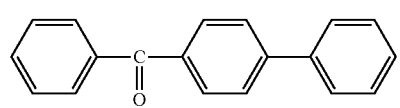

[Chemical Formula 7]

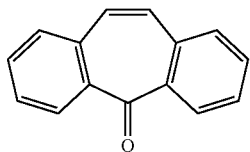

[Chemical Formula 8]

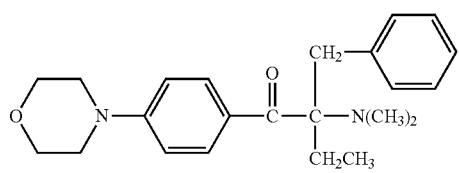

[Chemical Formula 9]

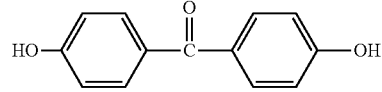

[Chemical Formula 10]

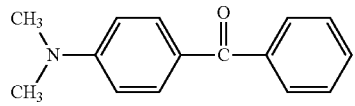

[Chemical Formula 11]

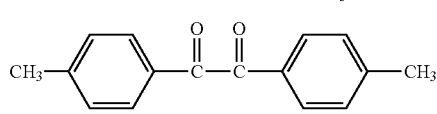

[Chemical Formula 12]

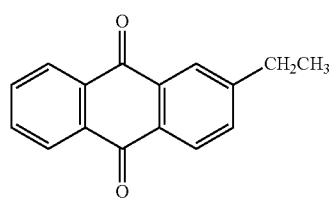

[Chemical Formula 13]

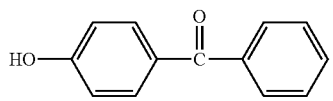

[Chemical Formula 14]

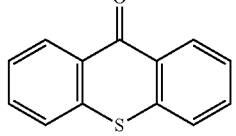

[Chemical Formula 15]

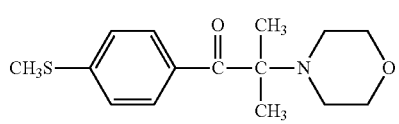

wherein the photoreaction initiator comprises at least one compound represented by the Chemical Formulas 3 to 15, and wherein a liquid crystal molecule adjacent to the first alignment layer has a pretilt angle greater than a liquid crystal molecule adjacent to the second alignment layer.

11. The method of claim 10, wherein the reactive mesogen in the first alignment layer is in the form of a mixture.

12. The method of claim 10, wherein the reactive mesogen is a compound having three or more ring structures.

13. The method of claim 12, wherein the reactive mesogen includes a compound represented by the following Chemical Formula 1 or Chemical Formula 2:

[Chemical Formula 1]

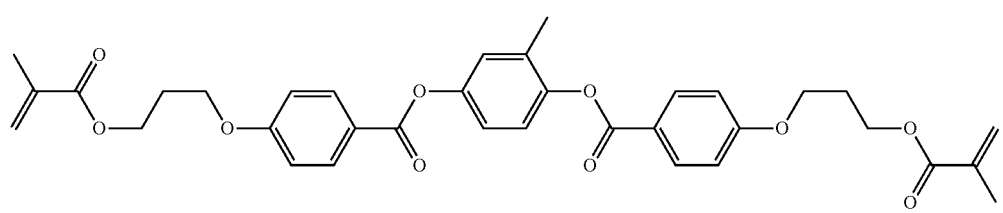

[Chemical Formula 2]

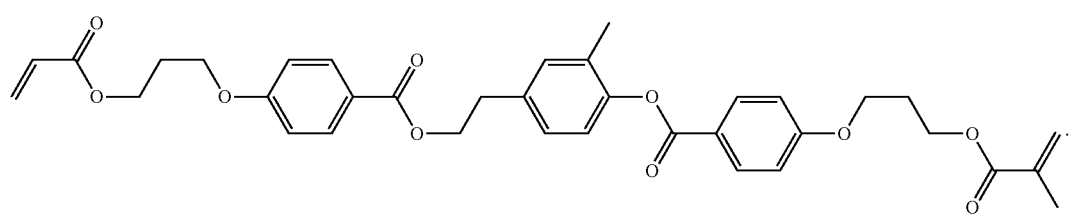

14. The method of claim 10, wherein a plurality of protrusions are formed between the second alignment layer and the liquid crystal layer in the irradiating of the ultraviolet light, and
   a number of the plurality of protrusions disposed between the second alignment layer and the liquid crystal layer is about 5% or less of a number of the plurality of protrusions disposed between the first alignment layer and the liquid crystal layer.

\* \* \* \* \*